Feb. 18, 1969   A. M. MOEN   3,428,087

ANTI-HAMMER FAUCET DEVICE

Filed June 8, 1966

INVENTOR.
Alfred M. Moen,
BY Parker & Carter
Attorneys.

United States Patent Office 3,428,087
Patented Feb. 18, 1969

3,428,087
ANTI-HAMMER FAUCET DEVICE
Alfred M. Moen, 25 Lakeview Drive,
Grafton, Ohio 44044
Filed June 8, 1966, Ser. No. 556,001
U.S. Cl. 137—625.17
Int. Cl. F16k 47/02, 3/34, 11/02
5 Claims

ABSTRACT OF THE DISCLOSURE

A mixing valve having means to slow the closing of the faucet stem to prevent what is known as "water hammer." At the end of the open stem a plug is positioned to substantially close the stem. The plug has a restricted passage which is in communication with the interior of the hollow stem and with a confined chamber below the stem. In normal operation the confined chamber will fill up with water, which has come through the restricted passage. During closing, the water in the confined chamber must escape before the stem can be completely closed. In the event of rapid closing of the stem, a seal ring positioned in the plug will expand into the restricted passage, further reducing its size so as to prevent rapid closing of the valve stem.

---

This invention relates to a mixing valve and faucet construction. It has for one object to provide a so-called "anti-hammer" construction. It is recognized that in the use of faucets with liquid running through them, frequently when the faucet or valve is closed suddenly, the sudden stopping of the moving column of water produces an effect called "hammer." This is likely to be audible and hence undesirable and it may even involve a violent blow upon the faucet structure. Such "hammer" has been known to break or burst pipes or pipe connections. At least the sound of "hammer" is unpleasant. It is one of the objects of the invention therefore to provide in effect a brake on the movement of a reciprocating valve member to prevent too sudden reciprocation of the valve member, particularly in the closing direction.

Figure 1:
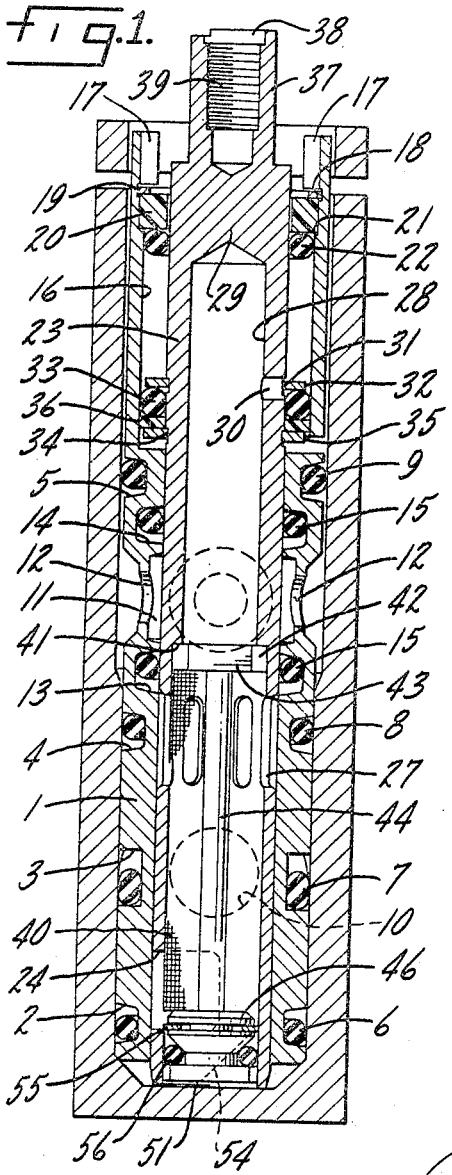
Figure 2:
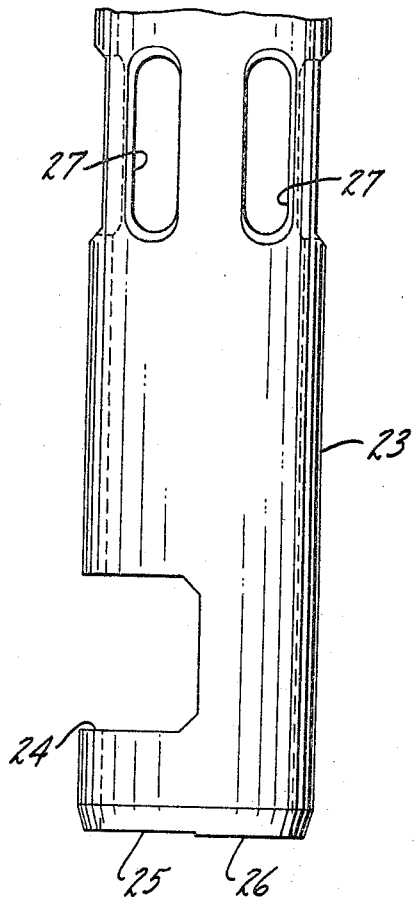
Figure 3:
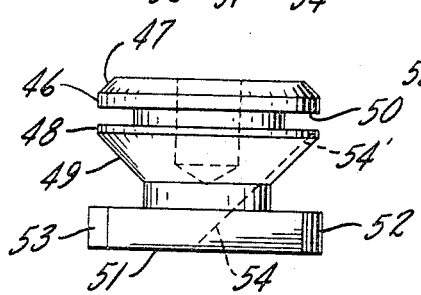
Figures 4, 5:
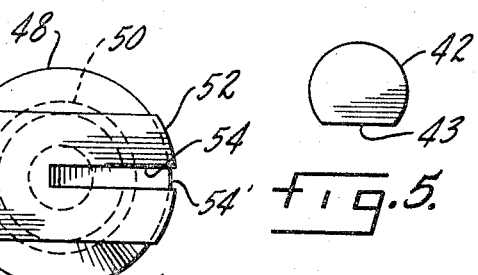

The invention is illustrated diagrammatically in the accompanying drawings wherein:

FIGURE 1 is a longitudinal section of one form of the device on an enlarged scale, FIGURE 2 is a side elevation of the movable valve member or stem, FIGURE 3 is a side elevation of the cushion plug taken on an enlarged scale, FIGURE 4 is an end elevation of FIGURE 3, and FIGURE 5 is a plan view of a thrust washer which appears in other figures.

Like numerals will be used to describe like parts in the following description of the invention.

The valve in which the "anti-hammer" device of this invention appears is shown generally in assembly in FIGURE 1. It includes a cylindrical sleeve 1, open at both ends and exteriorly grooved at 2, 3, 4 and 5. In each of these grooves is positioned a sealing ring 6, 7, 8 and 9 respectively. The grooves 3, as generally indicated in FIGURE 1, may extend diagonally about the sleeve 1. The grooves 2, 4 and 5 are substantially circumferential and receive conventional O-rings.

The sleeve is provided with inlet openings 10, only one of which is shown, through which hot and cold water respectively is discharged into the sleeve. The sleeve is also provided internally with an enlarged portion 11 from which one or more outlets 12 are provided for a discharge of fluid. The sleeve is internally grooved at 13 and 14 and receives in these grooves O-rings 15. The sleeve is internally enlarged adjacent one end, as indicated at 16, and is provided at one end with ears or extensions 17, 17. These ears are notched or grooved at 18 to receive a retaining ring 19. A packing ring 20 is positioned in contact with the ring 19 and it may contact a shoulder 21 formed within the sleeve. An O-ring 22 is positioned within the space 16 and generally in contact with the ring 22 and with the hollow valve stem which is described below.

There is received within the sleeve 1 for rotation and reciprocation a hollow valve stem 23. This valve stem is open at one end and is provided with a mixing notch which as shown in FIGURE 2 in particular extends partly around the valve stem 23. The mixing notch is indicated at 24. The valve stem 23 is shaped at its inner end to provide a lower portion 25 and a raised or higher portion 26. The valve stem is provided with one or more outlets 27 intermediate its ends and these outlet openings will be in register with the enlargement 11 of the sleeve 1 which is in communication with the outlet passage 12.

As shown particularly in FIGURE 1, the valve stem 23 is provided with a hollow portion 28 and a closed end 29. An opening or passage 30 extends from the interior of the stem to a groove 31 in the exterior of the stem. A snap or fastener ring 32 is positioned in the groove 31 and is generally in contact with an O-ring 33. The stem 23 is also exteriorly grooved at 34 and receives a snap or fastening ring 35. A packing ring 36 is positioned exteriorly of the stem 23 and in contact with the ring 35 and the O-ring 33. At its exposed end, the stem 23 is reduced as at 37 and is shaped to receive an operating handle by means of which it is rotated and reciprocated. An external hollow portion 38 may be formed from the exterior end of the sleeve and it may be internally threaded as at 39.

The valve stem may have within it in the path of fluid flow from the mixing notch to the outlet passages, a generally tubular screen 40. The screen may be cylindrical or it may be provided with longitudinal grooves or indentations. The invention is not limited to any particular screen formation. Whatever its precise details, the screen will lie within the hollow valve stem and in the path of liquid which enters it, flows through it and is discharged from it.

Formed within the sleeve 23 is a notch 41 upon which is seated a thrust washer 42 which is generally circular in plan and is cut away as at 43, as shown in FIGURE 5. It is held in place by the thrust pin 44, as shown in FIGURE 1. Therefore, at one end the pin bears against the thrust washer 42 and at its other end, it is received in a depression in the cushion plug which is shown generally in FIGURE 1 and in enlarged scale in FIGURES 3 and 4.

The thrust plug comprises a member, generally circular in plan, having an upper portion 46, tapered at its edges as at 47. The plug also comprises an intermediate member 48, inwardly tapered as at 49. The portions 46 and 48 are separated by a groove 50. The downward end of the cushion plug, as shown in FIGURE 1, comprises a flat member 51 which is shown in FIGURES 3 and 4 as being provided with arcuate end flat portions 52 and 53. The member 51 of which they form a part is generally flat. The portion 52 is slotted at 54 and this slot, as shown in FIGURE 4, extends inwardly at a point beyond the center of the cushion plug and partially into the portion 53 and lies radially with respect to the plug. It extends also along the conical portion 49 to the outer edge of the conical portion, as shown at 54' particularly in FIGURE 3.

The cushion plug is generally held in place by a snap ring or other fastening device 55 which extends in part into the mixing notch 24.

About the cushion plug and between the inner surface of the member 52 and the inclined surface 49 of the part 48 is positioned an O-ring 56 which is in contact with the surface 49 and with the facing or adjacent surfaces of the part 51, about the slot 54.

In particular, the arrangement of the portions 25 and 26 might be changed and the end of the hollow valve stem might be flat. An advantage of the construction shown is that the raised portion 26 is in line at least partially with that part of the valve stem which is weakened by the inlet passage 24. In the case of a violent closing of the valve which might result in heavy pressure on the stem, this pressure would be exerted through the stronger part of the stem and not through the weaker part in line with the inlet port 24.

The use and operation of the invention are as follows:

The valve stem is reciprocated to open and to close the valve or to move it to an adjusted position intermediate that of full closed or full open. The valve stem is rotated to control the temperature of the water which enters and it may be moved to a position of "all cold" or "all hot" or an intermediate position for a tempered flow of water. If the valve, after having been opened, is closed too suddenly, an effect known as "water hammer" may occur. A cushioning or braking effect of the cushion plug in cooperation with the O-ring which it embraces prevents too sudden closing of the faucet.

When the valve stem has been moved to open the faucet, water will pass through the small slot 54 in the cushion plug and under the O-ring in the conical surface adjacent the flat part and will be trapped between the end of the valve housing and the plug.

When now the valve stem is moved to the closing position, this trapped water must escape up into the main space within the valve stem and it can only do this through the narrow slot in the cushion plug. As the valve stem is moved to the closing position, pressure develops between the cushion plug and the end of the valve housing and a tendency is developed to expand the O-ring against the internal surface of the valve stem and against the cushion plug. The O-ring may be distorted partially at least into the groove in the face of the cushion plug. Thus the water which has been trapped below the cushion plug acts in cooperation with the plug and the O-ring and the slot in the plug to provide a restricted escape and hence to provide a definite brake to control the movement of the valve stem in the closing direction. The braking effect prevents "water hammer" because it prevents excessive rapid closing of the valve stem.

The grooved portion 54, 54' allows the water to be metered back into the hollow valve stem when the valve is closed. Also the flat portions on the plug allow the O-ring to bend or flex when the stem is moved quickly. The snap ring 55 in the groove 50 engages the mixing notch portion 24 in the hollow valve stem and retains the plug in the stem when the stem is moved quickly. When the stem is moved quickly and water within the stem must transfer to the outer side of the plug, it is important that the snap ring shall always positively retain the plug in the hollow valve stem.

Whereas the preferred form of the invention has been shown and described herein, it should be understood that there are many alterations, substitutions and modifications thereto within the scope of the following claims. In particular, the screen 40 may be omitted. It is useful in the total assembly of a valve of the type shown. However, the anti-hammer device of this application will operate satisfactorily whether or not such a screen is embodied in the total combination.

I claim:

1. In a valve assembly comprising a housing having inlet and outlet ports, said housing being closed at one end, a hollow valve stem having an open end mounted in said housing for rotation and reciprocation, said valve stem having inlet and outlet ports, means, at the open end of said stem, for preventing rapid closing of said stem, including a plug member at the stem open end, said plug, stem and housing defining a confined chamber, a restricted water passage in said plug connecting the interior of said stem with said confined chamber, and a seal ring mounted on said plug and bearing against said stem, said seal ring being positioned adjacent said restricted passage and being effective, at least partially, to further restrict said passage, when said valve stem is moved toward the closed position, with the further restriction of said passage being effective to control the flow of water from said confined chamber into the interior of said stem.

2. The structure of claim 1 further characterized by mounting means for positioning said plug, said mounting means extending into said stem inlet.

3. The structure of claim 1 further characterized in that said plug includes an annular groove, said seal ring being positioned in said groove.

4. The structure of claim 3 further characterized in that one side of said annular groove has a tapered wall.

5. The structure of claim 4 further characterized in that said restricted passage is formed by a diagonal slot extending through said annular groove.

References Cited

UNITED STATES PATENTS

| | | | |
|---|---|---|---|
| 985,220 | 2/1911 | Speakman | 251—51 |
| 2,890,720 | 6/1959 | Moen | 137—625.41 |
| 3,103,231 | 9/1963 | Moen | 137—625.17 |

M. CARY NELSON, *Primary Examiner.*

W. R. CLINE, *Assistant Examiner.*

U.S. Cl. X.R.

251—51